Jan. 16, 1940.   H. J. GERDAU   2,187,515
COOKING APPLIANCE
Filed Sept. 29, 1937   2 Sheets-Sheet 1
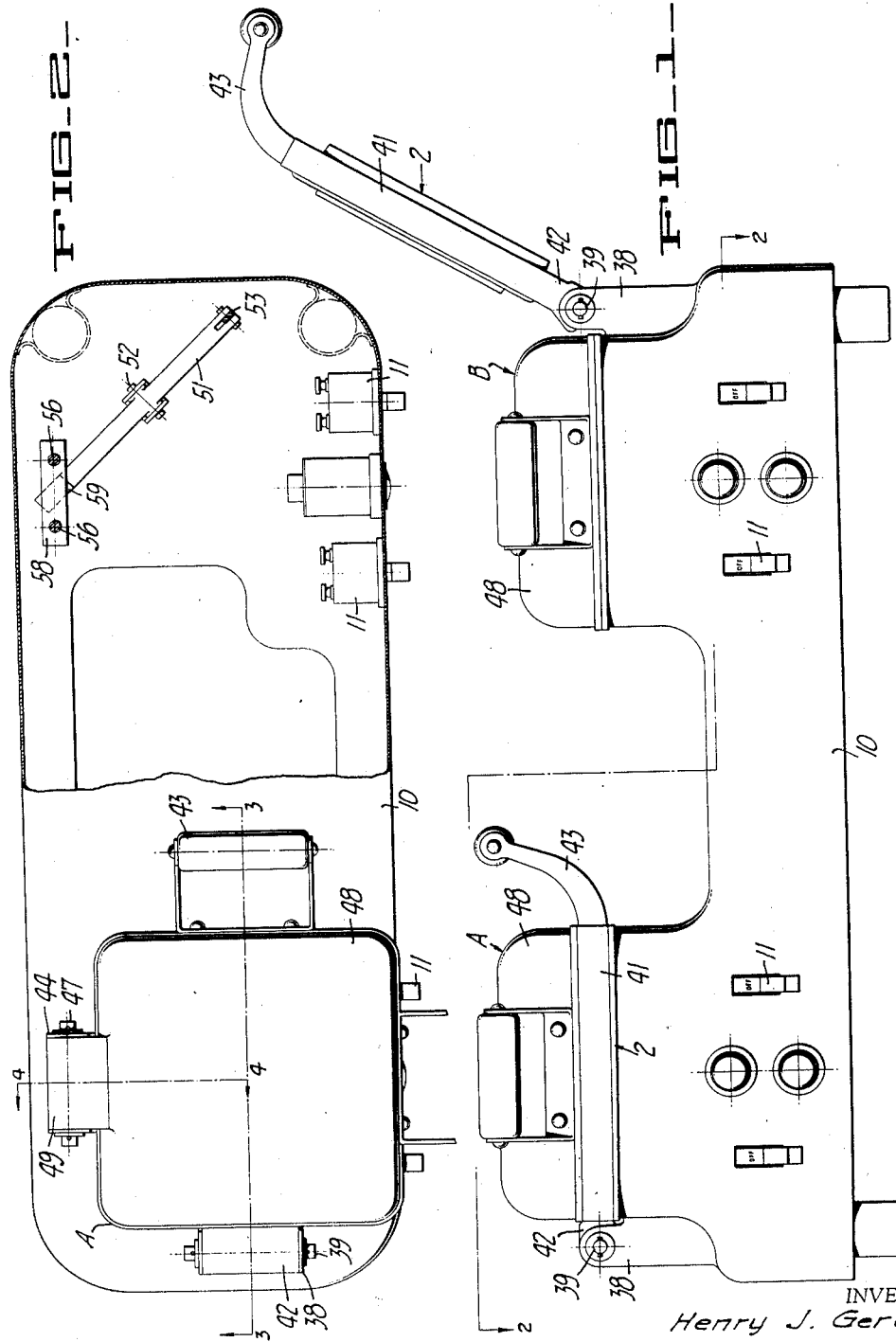
INVENTOR.
Henry J. Gerdau
BY Paul D Flehr
ATTORNEY.

Jan. 16, 1940.     H. J. GERDAU     2,187,515
COOKING APPLIANCE
Filed Sept. 29, 1937     2 Sheets—Sheet 2
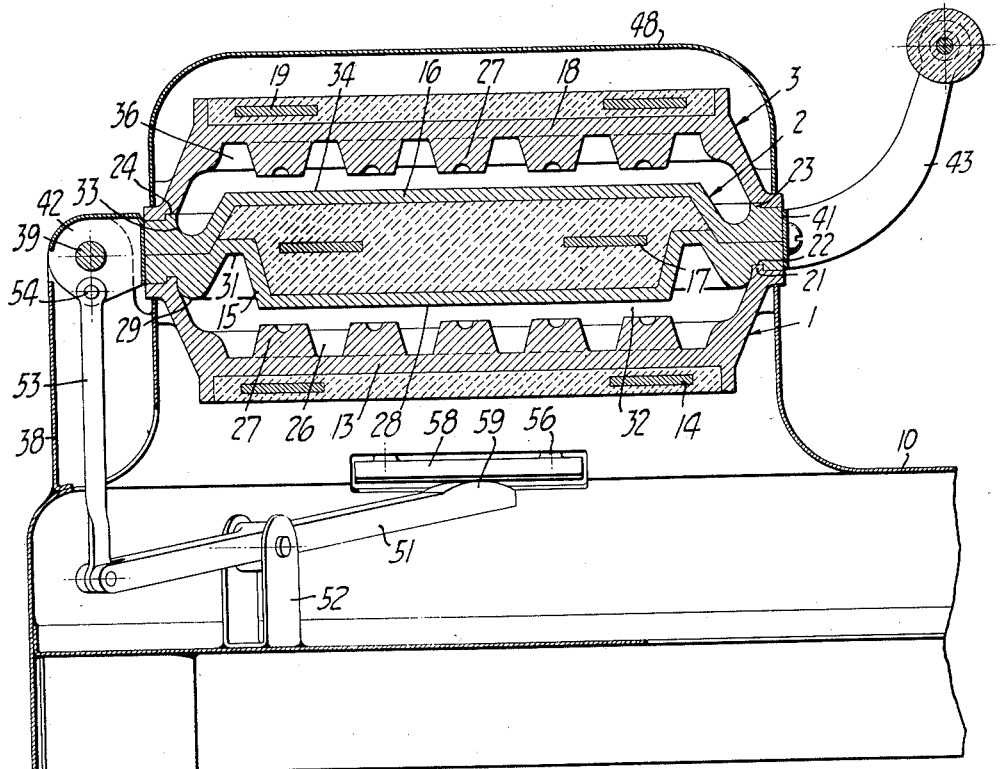
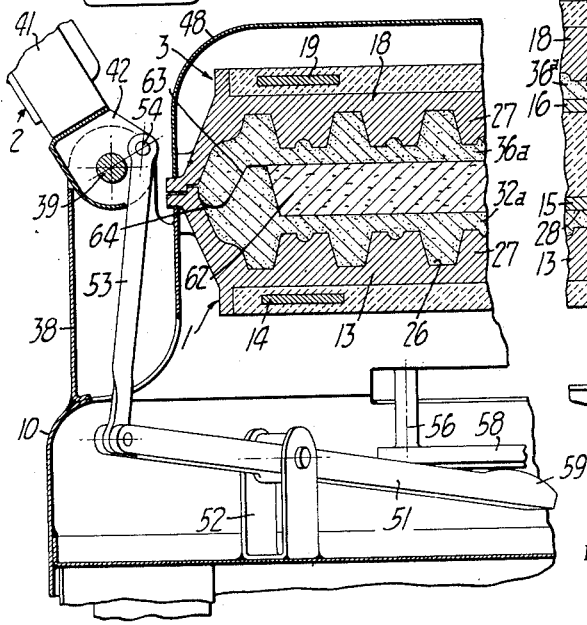
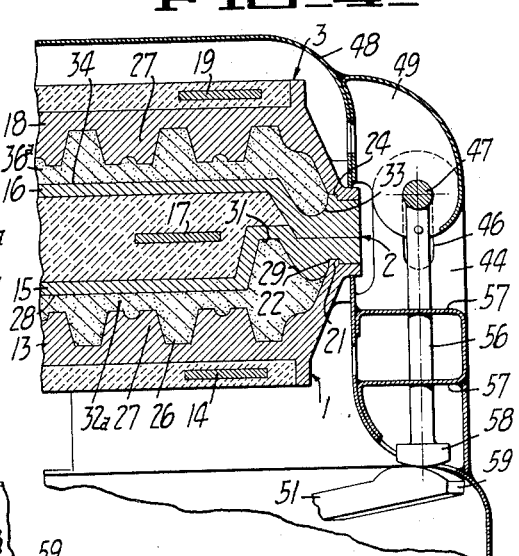
INVENTOR.
Henry J. Gerdau
BY Paul D. Flehr
ATTORNEY.

Patented Jan. 16, 1940

2,187,515

UNITED STATES PATENT OFFICE 2,187,515

COOKING APPLIANCE

Henry J. Gerdau, San Francisco, Calif.

Application September 29, 1937, Serial No. 166,353

8 Claims. (Cl. 53—10)

This invention relates generally to cooking appliances for preparing various food products from suitable batters. Appliances of this general type have found common application in restaurants and in the home, to prepare waffles and like food products. The invention also relates to cooked food products of the type having an inner filler, and to methods of preparing the same.

In general it is an object of the invention to devise a novel form of appliance making possible the cooking and assembly of edible enclosure for an inner filler, and particularly to afford such an appliance with a minimum number of cooking elements, which can be readily manipulated by an operator. The invention as disclosed herein is characterized by the use of three plate-like cooking elements, secured to a common mounting in such a manner that all three elements can be superposed to cook two parts of a completed food product, or two elements superposed to secure the two cooked parts together about an inner filler.

It is a further object of the invention to provide a novel food product of the above character, and a novel method for making the same.

Further objects of the invention will appear from the following description in which the preferred embodiment of the invention has been set forth in detail in conjunction with the accompanying drawings.

Referring to the drawings:

Fig. 1 is a side elevational view, illustrating the appliance incorporating the present invention.

Fig. 2 is a plan view of the appliance shown in Fig. 1.

Fig. 3 is a cross-sectional detail taken along the line 3—3 of Fig. 2.

Fig. 4 is a cross-sectional detail taken along the line 4—4 of Fig. 2.

Fig. 5 is a cross-sectional detail taken in the same manner as Fig. 4, but showing the first and third heating elements directly superposed upon each other, without the interpositioning of the second element.

Referring to the embodiment of the invention illustrated in the drawings, Figs. 1 and 2 show duplicate appliances A and B provided with a common mounting 10. The mounting is in the form of a suitable sheet metal housing, having its front equipped with the necessary control devices, such as the electrical switches 11.

The detailed construction for each of the appliances A and B, can be best understood by reference to Figs. 3 to 5 inclusive. Carried by the mounting are the three cooking elements 1, 2 and 3. Each of these elements is generally plate-like in form, and as viewed in plan can be contoured in accordance with the shape desired for the finished product, as for example circular, rectangular or substantially square with rounded corners as shown. The cooking element 1 consists of a body 13 of suitable metal, such as cast iron, aluminum, or an aluminum alloy, and in good heat conducting relationship with the lower side of this body, there is an electrical heating element 14. The cooking element 2 consists of two metal body parts 15 and 16, which are attached together, and which enclose the inner heating element 17. Cooking element 3 consists of a metal body 18, together with the electrical heating element 19. In order to insure proper alignment between the various cooking elements, when they are superposed as shown in Fig. 3, the body 13 of the cooking element 1 is shown provided with a raised rib 21, adapted to be accommodated in the groove 22 formed in the lower face of cooking element 2. Similarly the upper side of the cooking element 2 is shown being provided with a raised rib 23, which is accommodated within a recess 24, formed in the lower face of cooking element 3.

The opposed faces of the elements described above are contoured in a particular manner, to provide recesses or cavities for receiving the batter. Obviously the particular surface configuration employed can be modified in accordance with the particular shape and appearance of the final product desired. In the modification illustrated the upper face of cooking element 1 is provided with crossed grooves 26, thus affording a series of studs 27, like the studs provided on a conventional waffle iron. The lower face of the cooking element 2 is contoured to provide the lower intermediate surface 28, a rounded rib 29, and a groove 31 between the rib 29 and the peripheral edge of surface 28. Thus when the cooking elements 1 and 2 are directly superposed upon each other in the manner shown in Fig. 3, there is formed between these elements a batter receiving cavity 32. It will be obvious that the shaping of this cavity will determine the shape of the finished food product cooked within the same. With the contouring of these elements as described above, the batter will be cooked in the form of a shallow cup, with the lower face of this cup giving the appearance of a waffle, because of the studs 27.

The contouring of the lower face of the cooking element 3 is substantially identical with the contouring of the upper face of cooking element 1. However, the upper face of cooking element 2 is somewhat different than its lower face. Thus the upper face of element 2 is provided with a groove 33, to substantially the same diameter as the rib 29. Groove 33 surrounds an inner raised surface 34, which underlies the intermediate part of the cooking element 3. The batter receiving cavity formed between cooking elements 2 and 3 is designated by numeral 36, and is likewise in the form of a shallow cup, having edges adapted to interfit with the edges of the cup formed by cavity 32.

Various expedients can be employed to suitably secure the elements 2 and 3 to the mounting 10. As has been previously explained this mounting is such that elements 2 and 3 can be independently swung to out of the way positions. When element 2 is swung to an out of the way position, the connection permits element 3 to be swung down into direct superposed relationship with cooking element 1. The type of attachment illustrated has desirable features, and can be described as follows: The mounting 10 carries a bracket 38, forming a mounting for the pivot pin 39. The heating element 2 is surrounded by a band 41, and carried by this band are the lugs or tabs 42, which connect with the horizontal hinge pin 39. Secured to that edge of the cooking element 2, which is diametrically opposite from the hinge pin 39, there is a handle 43. The hinge pin 39 is located at one side of the appliance, so that when cooking element 2 is swung upwardly it moves to one side, to an out of the way position.

Upon the rear side of the appliance there is a bracket 44, having slots 46, which accommodate the hinge pin 47. Heating element 3 is carried within the metal shell 48, and the rear edge of this shell carries the tabs 49, which engage the hinge pin 47. Means are provided whereby hinge pin 47 is elevated and lowered automatically responsive to movements of the heating element 2. Thus within the main mounting 10, below the heating element 1, there is a lever 51, having a fulcrum support 52. A link 53 has its upper end provided with a pivotal connection 54, to one of the hinge tabs 42 for cooking element 2. The lower end of link 53 is connected to one end of lever 51. Disposed below the hinge pin 47 are the slidable thrust rods 56, which are retained by the guide members 57, and which have their lower ends connected by bar 58. The upper end of rods 56 engages the bottom side of pin 47, while the bar 58 is engaged by the adjacent end 59 of lever 51. With the mechanism described, upward swinging movement of cooking element 2 moves link 53 upwardly, to rock the lever 51, thus permitting rods 56 and also hinge 47, to lower. Conversely downward swinging movement of cooking element 2 to the position illustrated in Fig. 3, causes the pivot pin 47 to be raised back to the position illustrated in Fig. 4. It will be evident that this automatic shifting movement of the pivot pin 47 makes it possible to directly superpose elements 1 and 3 (Fig. 5) when the element 2 is swung to an out of the way position. In this connection note that the upper and lower faces respectively of elements 1 and 3 are so formed that the rib 21 on element 1, interfits with the recess 24 on element 3.

Use of the appliance described above and the carrying out of the present method, is as follows: It will be assumed that the cooking elements have been heated to a suitable temperature, and that a suitable batter has been prepared. It will also be presumed that the faces of the elements have been properly treated or impregnated with a cooking oil, so that the cooked batter can be readily removed. The operator swings both the elements 2 and 3 to out of the way positions, and then introduces a suitable quantity of batter upon the cooking element 1. Cooking element 2 is now swung down into superposed relationship with cooking element 1, and another quantity of batter applied to the upper side of this element. Cooking element 3 is now swung down to superposed relationship with element 2, so that the three elements now occupy positions as shown in Fig. 3. While the batter is being cooked it takes forms in accordance with the shaping of cavities 32 and 36, and fills these cavities substantially as illustrated in Fig. 4.

At the end of the cooking operation the operator swings cooking element 3 to an out of the way position, at which time the cooked batter will remain upon the element 3. This is because the lower face of the cooking element 3 presents a materially greater area in contact with the cooked batter, as compared to the area presented by the upper face of cooking element 2. The operator now swings cooking element 2 to an out of the way position, at which time the cooked batter in recess 32, will remain upon cooking element 1. Any desired type of filler is now introduced into the cooked batter in the cooking element 1. This filler may be marmalade, jelly, cooked fruit, uncooked materials such as ice cream, or fresh fruit, or foods such as cooked meats, or vegetables. After introduction of this filler, cooking element 3 is now swung down into direct superposed relationship with cooking element 1, as shown in Fig. 5. In Fig. 5 the two parts of the cooked batter have been indicated by numerals 32a and 36a, and the filler by numeral 62. Note that the side portions of the cooking batter have interfitting relationship. The surfaces which are in more or less interfitting engagement, include the surfaces designated by numeral 63, which are inclined, and the surfaces 64, which are curved. Upon retaining the two cooked parts 32a and 36a in engagement for a short period of time, they will adhere together, so that upon swinging cooking element 3 back to an out of the way position, the part 36a remains upon the part 32a. The operator can now remove the completed product from the lower cooking element 1, and it is now ready to serve.

It has been pointed out that the cooperating surfaces of the different heating elements can be variously contoured, in accordance with the appearance, shape and size of the finished product desired. However, it is desirable in this connection to provide parts having interfitting edge portions as described above, to facilitate forming a seal between the two parts in the final cooking operation. It is also desirable to so proportion the cavities that when a filler is introduced into the lower cooked part, the space occupied by the filler is not decreased in volume as the upper cooked part is applied. This is true with the configurations illustrated in the drawings, since the space occupied by the filler 62 (Fig. 5), is not decreased so as to cause a squeezing out of the filler, when the upper cooked part 36a is applied.

I claim:

1. In a cooking utensil, a mounting, a heated plate like element carried by said mounting in a substantially horizontal position, a second heated plate-like cooking element hinged to said mounting whereby said second element can be moved to a position directly superposed upon the first element or can be swung to an out of the way position, and a third heated plate-like cooking element hinged to said mounting and movable from an out of the way position, to a position directly above the first named element with the second element interposed between the same, or directly upon the first element with the second element in an out of the way position.

2. In a cooking utensil, a mounting, a heated plate-like element carried by said mounting in a substantially horizontal position, a second heated plate-like cooking element movably carried by said mounting whereby said second element can be moved to a position directly superposed upon the first element or can be swung to an out of the way position, and a third heated plate-like cooking element movably carried by said mounting and movable either from an out of the way position, to a position directly above the first named element with the second element interposed between the same, or to a position directly upon the first element with the second element in an out of the way position, the upper and lower faces respectively of the first and second elements, and the upper and lower faces respectively of the second and third elements, when the three elements are superposed, forming batter receiving cavities, said cavities being so formed that when the first and third elements are directly superposed upon each other, without interposition of the second element, edge portions of batter cooked within said cavities are brought into direct engagement to form a seal.

3. In a cooking utensil, a mounting, a first plate-like electrically heated cooking element carried by said mounting in a substantially horizontal position, a second plate-like electrically heated cooking element adapted to be superposed directly upon the first named cooking element, means forming a hinged connection between said second cooking element and the mounting, whereby said second element can be swung from a position in which it is directly superposed upon the first element, to an out of the way position, the axis of said pivotal connection being substantially horizontal, a third plate-like electrically heated cooking element adapted to be directly superposed upon the second element, when said second element is superposed upon the first element, said third element being also adapted to be directly superposed upon the first element, when said second element is moved to an out of the way position, and means forming a hinge connection between said third element and said mounting, whereby said third element can be moved from either one of said aforementioned positions, to an out of the way position.

4. In a cooking utensil, a mounting, a first plate-like electrically heated cooking element carried by said mounting in a substantially horizontal position, a second plate-like electrically heated cooking element adapted to be superposed directly upon the first named cooking element, means forming a hinge connection between said second cooking element and the mounting, whereby said second element can be swung from a position in which it is directly superposed upon the first element, to an out of the way position, the axis of said pivotal connection being substantially horizontal, a third plate-like electrically heated cooking element adapted to be directly superposed upon the second element, when said second element is superposed upon the first element, said third element being also adapted to be directly superposed upon the first element, when said second element is moved to an out of the way position, and means forming a hinge connection between said third element and said mounting, whereby said third element can be moved from either one of said aforementioned positions, to an out of the way position, the opposed faces of the first and second elements, when the second element is superposed upon the first element, being contoured to form between them a batter receiving cavity, and the opposed faces of the second and third elements, when said elements are superposed upon each other, being likewise contoured to form a second batter receiving cavity, said cavities being so shaped that peripheral edge portions of batter cooked in the same are brought into direct engagement, when the first and third elements are directly superposed upon each other, without interposition of the second element.

5. In a cooking apparatus, a mounting, a plate-like cooking element carried by the mounting in substantially horizontal position, a second plate-like cooking element adapted to be superposed upon the first element, means forming a hinge connection between said second element and said mounting, whereby the second element can be swung from said superposed position to an out of the way position, a third plate-like cooking element, means forming a hinge connection between the third element and the mounting, and means for shifting said last named hinged connection in a vertical direction in response to swinging movement of the second element, whereby when the second element is superposed on the first element the third element can be superposed on the second element, and when the second element is in an out of the way position the third element can be directly superposed on the first element.

6. In a cooking utensil, at least three cooking elements, the second of said elements being adapted to be interposed between the first and third elements with the opposed faces of the first and second elements and of the second and third elements in close juxtaposition, the first and third elements being capable of being directly superposed one upon the other, without the interposition of the second element, the opposed faces between the first and second elements being contoured to form a batter receiving cavity when in juxtaposition, the opposed faces of the second and third elements being also contoured to form between them a batter receiving cavity when in juxtaposition, and the opposed faces between the first and third elements, when directly superposed upon each other without interposition of the second element, being formed to bring the peripheral edge portions of batter cooked within said cavities into direct contact.

7. In a cooking utensil, at least three plate-like cooking elements, the second of said elements being adapted to be interposed between the first and third elements with the opposed faces of the first and second elements and of the second and third elements in close juxtaposition, the first and third elements being capable of being directly superposed one upon the other, without interposition of the second element, the opposed faces of the first and second elements being contoured whereby when in juxtaposition they form between them a cup shaped batter receiving cavity, the opposed faces of the second and third elements being likewise contoured whereby when in juxtaposition they form between them a batter receiving cavity, said first and third elements being so contoured that when superposed directly upon each other, without interposition of said second element, that edge portions of batter cooked in said cavities are brought into direct engagement, whereby a seal can be formed.

8. In a cooking utensil, at least three plate-like cooking elements, a mounting serving to retain the first of said elements in a horizontal position, means forming a connection between the third of said elements and said mounting, whereby said third element can be moved from a position superposed upon the first element or to an out of the way position, and means forming a connection between said second cooking element and said mounting, whereby said second element can be interposed between the first and third elements with the opposed faces of the first and second elements and of the second and third elements in close juxtaposition, or can be swung to an out of the way position, to permit direct superposing of the third element upon the first element.

HENRY J. GERDAU.